(12) United States Patent
Ishigaki et al.

(10) Patent No.: US 6,464,203 B1
(45) Date of Patent: Oct. 15, 2002

(54) SWING-DOOR GATE VALVE

(75) Inventors: Tsuneo Ishigaki; Ikuo Kanzaka; Kenji Waragai, all of Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/709,328

(22) Filed: Nov. 13, 2000

(30) Foreign Application Priority Data

Dec. 6, 1999 (JP) .......................................... 11-346262

(51) Int. Cl.[7] ................................................. F16K 3/18
(52) U.S. Cl. ........................ 251/326; 251/301; 251/215
(58) Field of Search ................................ 251/326, 301, 251/215, 56, 229, 251

(56) References Cited

U.S. PATENT DOCUMENTS

| | | | | |
|---|---|---|---|---|
| 3,973,753 A | * | 8/1976 | Wheeler ...................... 251/204 |
| 5,002,255 A | * | 3/1991 | Sawa et al. ................... 251/193 |
| 5,626,324 A | * | 5/1997 | Nakamura et al. ...... 251/158 X |
| 6,089,537 A | * | 7/2000 | Olmsted .................. 251/203 X |

* cited by examiner

Primary Examiner—Kevin Lee
(74) Attorney, Agent, or Firm—Oblon, Spivak, McClelland, Maier & Neustadt, P.C.

(57) ABSTRACT

A gate 3 for opening and closing an opening 2 of a chamber 1 is fixed to a top end of an arm 7 swung between a position facing the opening and a retreating position on the side thereof. A base end of the arm 7 is supported by an output shaft 10 of a fluid pressure cylinder 8 driven in parallel with a direction in which the gate comes into contact with and is separated from the opening 2, and a cam follower 12 fit in a guide groove 14 of a machine frame 6 is provided at the base end of the arm 7. The guide groove is formed by an axial-direction groove 14a for carrying the gate 3 at the position facing the opening 2 and then moving it when the gate is located at a position in the vicinity of the opening of the chamber 1, and a slant-periphery direction groove 14b connected thereto for retreating the gate to the side of the opening.

11 Claims, 3 Drawing Sheets

SWING-DOOR GATE VALVE

TECHNICAL FIELD

The present invention relates to a swing-door gate valve for opening and closing an opening of a chamber.

BACKGROUND ART

A swing-door gate valve opens an opening of a chamber by moving a gate for closing the opening to a side position, so that a work or the like is taken in and out of the chamber. In the swing-door gate valve as described above, when the gate is brought into contact with or separated from the opening of the chamber, unless the gate is brought into contact with or separated from a sealing surface vertically in a state in which the gate is fronted to the opening of the chamber, a slide occurs between a sealing material provided at the gate and the sealing surface of the chamber, resulting in occurrence of abrasion or dust due to their frictional slide.

However, there is a lot of difficulty to realize a mechanism for performing contact/separation of the gate in a vertical direction relative to the chamber sealing surface and for moving it between a position facing the opening of the chamber and a position retreated aside with a simple and cheap configuration.

DISCLOSURE OF THE INVENTION

A technical object of the present invention is to realize the contact/separation of the gate in the vertical direction relative to the chamber sealing surface and the movement between the position facing the opening of the chamber and the retreating position on the side thereof with a simple and cheap mechanism in the swing-door gate valve.

Another technical object of the present invention is to provide a swing-door gate valve in which no slide occurs at a sealing material so that no dust is substantially produced by bringing the gate into contact with and making it separated from the sealing surface of the chamber vertically with a simple mechanism.

Another technical object of the present invention is to provide a swing-door gate valve in which a driving section of the gate has a simple and compact structure to be driven by a single actuator, and also which is cheap and easy to control the driving, and as a result, a signal system can also be simply and cheaply configured. In order to solve the aforesaid problems, the swing-door gate valve according to the present invention is characterized by comprising: an output shaft supported by a machine frame so as to freely advance or recede in an axial direction thereof and also to be freely rotated around the axis; an arm in which a base end is fixed to the output shaft and a top end is extended to a direction perpendicularly crossing to the output shaft; a gate attached to the top end of the arm, for opening and closing the opening of the chamber; an actuator for causing the output shaft to advance and recede in the axial direction thereof; and a direction-changing mechanism for changing the movement of the arm that is moved to the axial direction of the output shaft, following the forward and backward movement of the output shaft, to a swing-direction movement in which the gate at the top end of the arm is moved between the position facing the opening of the chamber and the position retreated to the side of the opening, and a vertical-direction movement in which the gate is moved vertically relative to the opening of the chamber to come into contact with and to be separated from the opening.

The direction-changing mechanism according to the present invention includes a guide groove formed in the machine frame and a cam follower provided at a base end of the arm and which is fit in the guide groove to be movable, wherein the guide groove includes an axial-direction groove that is parallel with the output shaft and a slant-periphery direction groove extending slantly from an end of the shaft-direction groove.

In addition, the gate is preferably attached to the top end of the arm with free movement and the actuator is preferably a fluid pressure cylinder.

In the gate valve having the aforesaid structure, when the actuator is driven, the arm is moved while the direction thereof being controlled by the direction-changing mechanism by the thrust affected to the output shaft, and more specifically, the cam follower is moved along the guide groove via the arm, and thereby the gate is moved between a closing position for closing the opening of the chamber and the retreating position retreated from the opening to the side thereof.

That is, when the gate is located at the position retreated from the opening of the chamber to the side thereof, and which is moved in a direction closing the opening, the gate is first moved to the position fronting onto the opening by the swing of the arm while moving the gate toward the chamber side, and after the gate has reached the position fronting onto the opening, the gate is moved vertically to the sealing surface of the chamber.

On the other hand, when the gate is moved from a state closing the opening to a position at which the opening is opened, the gate performs a reverse operation to the above by the driving of the actuator in a reverse direction, being moved to the position retreated from the opening to the side thereof.

In the aforesaid swing-door gate valve, the contact/separation of the gate in the vertical direction relative to the chamber sealing surface and the movement between the position facing the chamber opening and the retreating position on the side thereof can be realized with a simple, compact, and cheap configuration using a single actuator. In addition, the gate can be brought into contact with and separated from the sealing surface of the chamber vertically, thereby providing a swing-door gate valve in which no slide occurs at the sealing material, thereby producing no dust substantially.

Furthermore, since the aforesaid single actuator is used, the control of the driving is easy, consequently, the signal system can also be configured simply and cheaply.

DETAILED DESCRIPTION OF THE EMBODIMENTS

An embodiment of the present invention will be described in detail hereinbelow with reference to the drawings.

Figure 1:
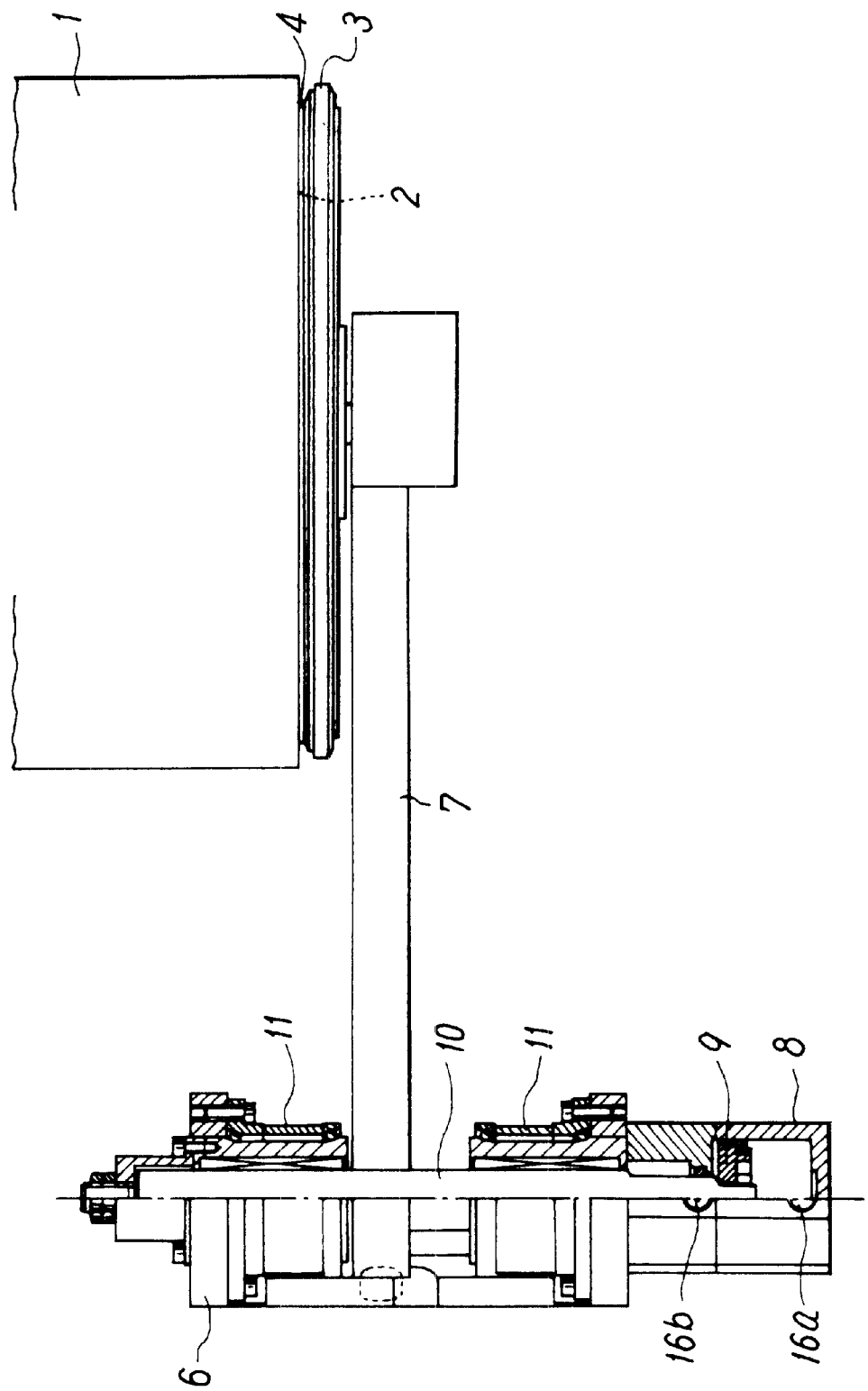
FIG. 1 is a sectional side elevation view showing an embodiment of a gate valve according to the present invention.
Figure 2:
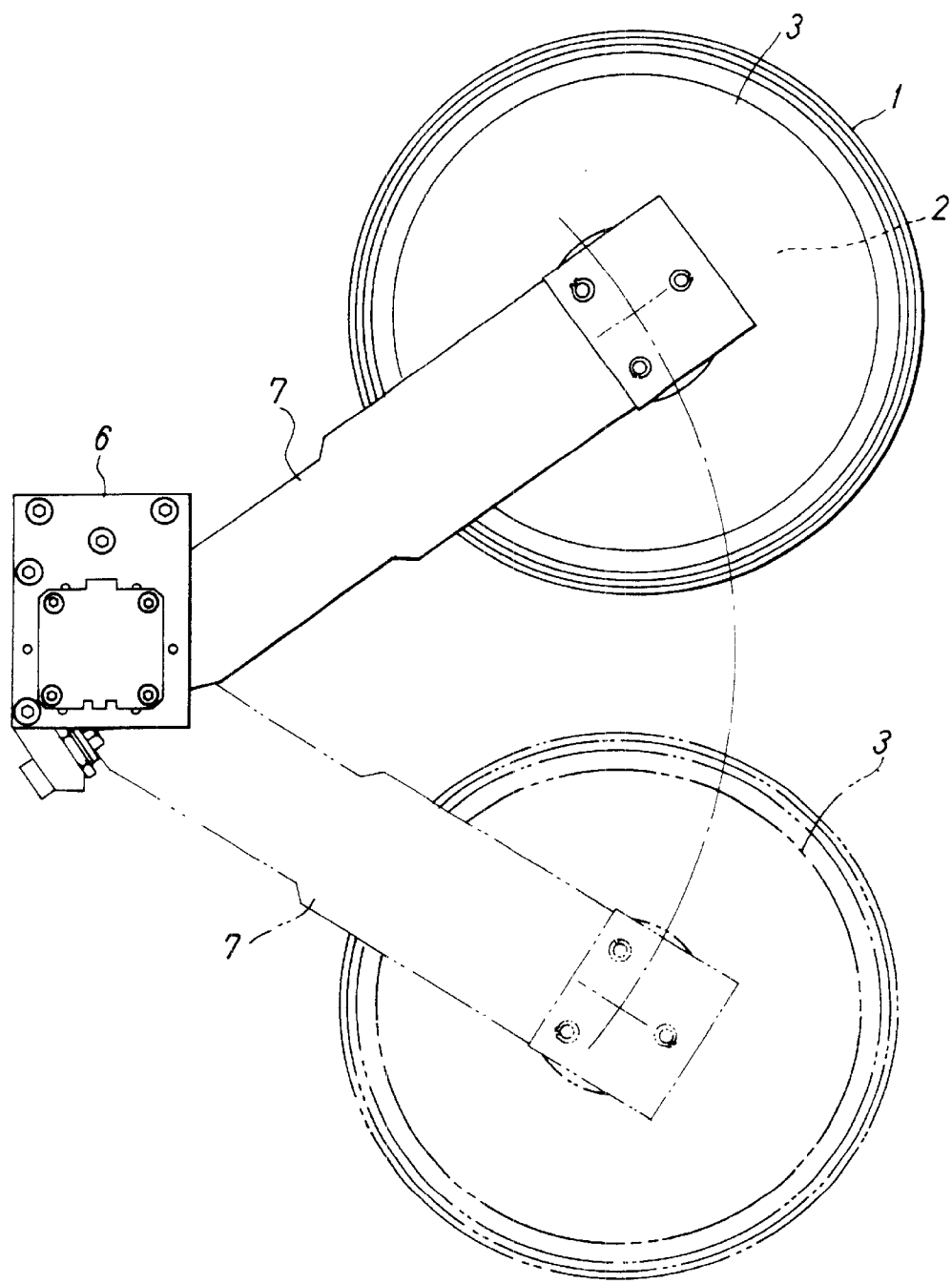
FIG. 2 is a bottom plan view of the embodiment.

FIG. 1 and FIG. 2 illustrate a constructional example of a swing-type gate valve according to the present invention. The gate valve includes a gate 3 for opening and closing an opening 2 at a lower part of a chamber 1. The gate 3 has a sealing material 4 for closing the opening 2 at a periphery thereof by coming into contact with a sealing surface formed at the periphery of the opening 2 of the chamber 1, and which is connected to a top end of an arm 7 supported by a machine frame 6 with a free movement of vertical non-uniformity. The arm 7 carries the gate 3 to be movable between a closing position (a position indicated by a solid line in FIG. 2) at which the gate 3 closes the opening 2 of the chamber 1 and a retreating position (a position indicated by a dot-dash line in FIG. 2) at which the gate 3 retreats from the opening 2 to the side thereof, and facilitates a work or the like to be taken in and out of the chamber 1 at the retreating position of the gate not facing the opening 2.

The machine frame 6 is provided with an actuator and an output shaft 10 in order to support the arm 7 to be freely swung, and to enable the arm to perform the opening/closing operation. The actuator is constructed by a fluid pressure cylinder 8 disposed at a lower part of the machine frame 6, wherein the output shaft 10 is connected to a piston 9. The output shaft 10 is disposed so as to be driven in parallel with a direction in which the gate 3 comes into contact with and is separated from the opening 2 of the chamber 1 while fronting thereto, which is supported by bearings 11 and 11 to be movable at an upper and lower parts of the machine frame 6, and which is also supported in the axial direction to be slidable. The supporting of the output shaft 10 by the bearing 11 is not necessarily conducted at the upper and lower parts of the machine frame 6, but only at one of the upper part or the lower part of the machine frame 6, alternatively, only at an intermediate part between the upper part and the lower part. Furthermore, the sliding of the output shaft 10 to the bearing 11 can be performed by a key groove mechanism, a ball spline shaft, or the like.

In addition, reference numerals 16a and 16b in the drawings indicate ports for supplying and exhausting pressure fluids (compressed air) to/from the opposite sides of the piston 9 of the fluid pressure cylinder 8.

The arm 7 is fixedly attached to the output shaft 10 of the fluid pressure cylinder 8, and is moved in an axial direction of the output shaft 10, following a forward and backward movement of the output shaft 10 by the fluid pressure cylinder 8. The machine frame 6 is provided with a direction-changing mechanism for changing the movement of the arm 7 in the axial direction to a swing-direction movement with the output shaft 10 as the center, in which the gate 3 at the top end of the arm is moved between the position facing the opening 2 of the chamber 1 and the position retreated to the side of the opening 2, and a vertical-direction movement in which the gate 3 is moved vertically relative to the opening 2 of the chamber 1 to come into contact with and is separated from the opening 2.

Figure 3:
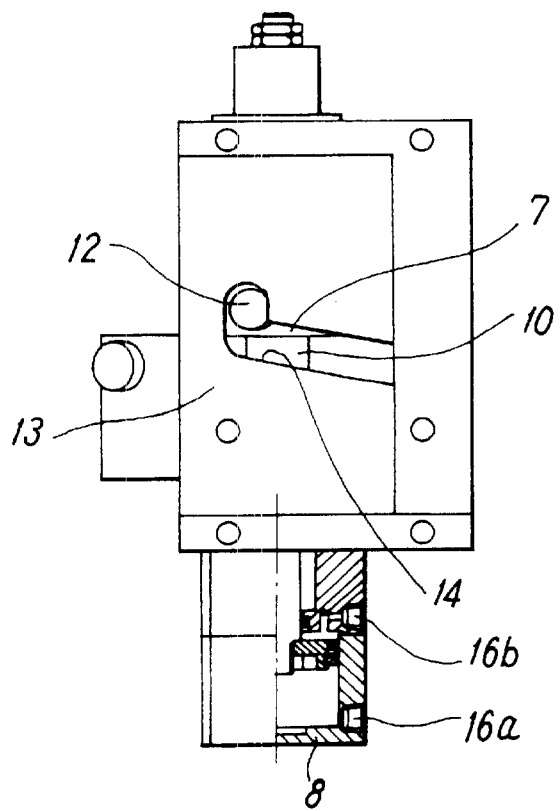
FIG. 3 is a left side elevation view of a machine frame in the embodiment in FIG. 1.

The direction-changing mechanism swings the arm 7 by the driving of the fluid pressure cylinder 8 in a manner so as to carry the gate 3 at the position facing the opening 2 when the gate 3 is located at a position in the vicinity of the opening 2 of the chamber 1, and to retreat the gate 3 to the side of the opening 2 when the gate 3 is located at a position away from the opening 2. Specifically, as shown in FIG. 3 and FIG. 4, the direction-changing mechanism comprises a cam follower (rolling body) 12 fixed to a base end of the arm 7 to be rotatable via the bearing, and a guide groove 14 provided on a wall surface 13 around the output shaft 10 of the fluid pressure cylinder 8 in the machine frame 6, in which the cam follower 12 is fit.

Figure 4:
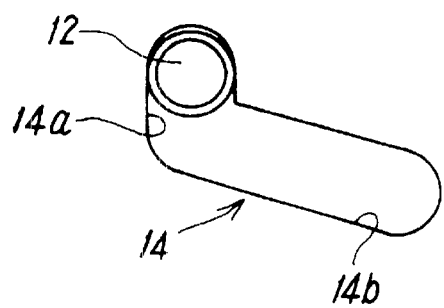
FIG. 4 is a development view showing the details of a guide groove in FIG. 3.

The guide groove 14 includes, as clearly shown in FIG. 4, an axial-direction groove 14a that is parallel with the output shaft 10, and a slant-periphery direction groove 14b extending slantly from an end of the axial-direction groove 14a along the circumference surrounding the output shaft 10. When the gate 3 is located at the position in the vicinity of the opening 2 of the chamber 1, the axial-direction groove 14a carries the gate 3 at the position facing the opening 2, and guides the sealing material 4 in the direction coming into contact with and separated from the sealing surface at the periphery of the opening 2 vertically by the driving of the fluid pressure cylinder 8. When the gate 3 is located at the position slightly away from the opening 2, the slant-periphery direction groove 14b swings the arm 7 in a manner so as to retreat the gate 3 to the side of the opening 2.

In the gate valve having the aforesaid structure, when the piston 9 is moved upward by supplying the pressure fluid to the port 16a of the fluid pressure cylinder 8 from a state in which the piston 9 is located at a lower end of the fluid pressure cylinder 8, and the gate 3 is located at the position indicated by the dot-dash line in FIG. 2, which is retreated from the opening 2 of the chamber 1 to the side thereof, that is, from a state in which the cam follower 12 is located at a terminal (lower end) of the slant-periphery direction groove 14b, the cam follower 12 at the base end of the arm 7 is moved by the thrust applied to the output shaft 10, along the slant-periphery direction groove 14b at the guide groove 14, so that the gate 3 is moved (swung) in the direction fronting onto the opening 2 of the chamber 1 from the retreating position retreated to the side relative to the opening 2 while coming close to the opening 2 of the chamber 1.

When the gate 3 moves toward the opening 2 by the swing of the arm 7, and correspondingly, the cam follower 12 reaches a connecting part of the slant-periphery direction groove 14b relative to the axial-direction groove 14a, the gate 3 reaches the position fronting onto the opening 2 by the arm 7, and next, the cam follower 12 is moved in the axial direction of the output shaft 10 along the axial-direction groove 14a, consequently, the gate 3 is moved vertically toward the sealing surface of the chamber 1.

As a result, since the gate 3 can be brought into contact with the sealing surface of the chamber 1 vertically, no slide occurs at the sealing material 4, thereby producing no dust substantially.

On the other hand, in the case where the gate 3 is moved from a state closing the opening 2 to the position to release the opening 2, the gate performs a complete reverse operation to the above by the driving of the actuator in a reverse direction, and which is moved from the opening to the position retreated aside.

That is, when the pressure fluid in the port 16a of the fluid pressure cylinder 8 is exhausted, and also the pressure fluid is supplied to the port 16b, the piston 9 is moved downward in order to move the cam follower 12 downward along the axial-direction groove 14a via the arm 7, consequently, the closing state of the opening 2 of the chamber 1 by the gate 3 is released.

When the piston 9 is further moved downward, the cam follower 12 reaches the connecting part of the axial-direction groove 14a relative to the slant-periphery direction groove 14b, where the cam follower 12 is moved horizontally while moving in the axial direction along the slant-periphery direction groove 14b by the thrust applied to the output shaft 10, thereby swinging the arm 7 in order to move the gate 3 from the position indicated by the solid line, which fronts to the opening of the chamber, to the position indicated by the dotted line, which is retreated to the side of the opening 2 in FIG. 2. In this state, the work or the like can be easily taken in and out of the chamber 1.

According to the swing-door gate valve of the present invention as described above, the contact/separation of the gate in the vertical direction relative to the chamber sealing surface and the movement between the position facing the chamber opening and the retreating position on the side thereof can be realized with a simple, compact, and cheap configuration using the single actuator. In addition, since the gate is brought into contact with and separated from the sealing surface of the chamber vertically, no slide occurs at the sealing material, thereby producing no dust substantially. Furthermore, since a driving section of the gate has a simple structure to be driven by the single actuator, the control of the driving is easy, consequently, the signal system can also be configured simply and cheaply.

What is claimed is:

1. A swing-door gate valve characterized by comprising:

an output shaft supported by a machine frame to freely advance or recede in the axial direction thereof and also to be rotatable around the axis thereof;

an arm in which a base end is fixed to said output shaft, and a top end extends in a direction perpendicularly crossing to the output shaft;

a gate attached to the top end of said arm, for opening and closing an opening of a chamber;

an actuator for causing said output shaft to advance or recede in the axial direction; and a direction-changing mechanism for changing the direction of the movement of said arm moved in the axial direction of said output shaft, following the forward and backward movement of the output shaft, to a swing-direction movement in which said gate at the top end of the arm is moved between a position facing the opening of the chamber and a position retreated to the side of the opening, and a vertical-direction movement in which said gate is moved vertically relative to the opening of the chamber to come into contact with or to be separated from the opening.

2. A swing-door gate valve as in claim 1, characterized in that said direction-changing mechanism includes a guide groove formed at the machine frame and a cam follower provided at the base end of the arm, and fit in the guide groove to be movable, wherein said guide groove has an axial-direction groove parallel with the output shaft and a slant-periphery direction groove extending slantly from an end of the axial-direction groove.

3. A swing-door gate valve as in claim 1, characterized in that said gate is attached to the top end of the arm with free movement.

4. A swing-door gate valve as in claim 1, characterized in that said actuator is a fluid pressure cylinder.

5. A swing-door gate valve comprising:

an output shaft supported by a machine frame to freely advance or recede in the axial direction thereof and also to be rotatable around the axis thereof;

an arm in which a base end is fixed to said output shaft, and a top end extends in a direction perpendicularly crossing to the output shaft;

a gate attached to the top end of said arm, for opening and closing an opening of a chamber;

an actuator for causing said output shaft to advance or recede in the axial direction; and a direction-changing mechanism configured to change the direction of the movement of said arm moved in the axial direction of said output shaft, said direction-changing mechanism including a guide groove formed at the machine frame and a cam follower provided at the base end of the arm, and fit in the guide groove to be movable, wherein said guide groove has an axial-direction groove parallel with the output shaft and a slant-periphery direction groove extending slantly from an end of the axial-direction groove.

6. A swing-door gate valve as in claim 5, wherein said gate is attached to the top end of the arm with free movement.

7. A swing-door gate valve as in claim 5, wherein said actuator is a fluid pressure cylinder.

8. A swing-door gate valve comprising:

an output shaft supported by a machine frame to freely advance or recede in the axial direction thereof and also to be rotatable around the axis thereof;

an arm in which a base end is fixed to said output shaft, and a top end extends in a direction perpendicularly crossing to the output shaft;

a gate attached to the top end of said arm, for opening and closing an opening of a chamber;

an actuator for causing said output shaft to advance or recede in the axial direction; and means for changing the direction of the movement of said arm moved in the axial direction of said output shaft to a swing-direction movement in which said gate at the top end of the arm is moved between a position facing the opening of the chamber and a position retreated to the side of the opening, and a linear-direction movement in which said gate is moved linearly relative to the opening of the chamber to come into contact with or to be separated from the opening.

9. A swing-door gate valve as in claim 8, wherein said means for changing the direction includes a guide groove formed at the machine frame and a cam follower provided at the base end of the arm, and fit in the guide groove to be movable, wherein said guide groove has an axial-direction groove parallel with the output shaft and a slant-periphery direction groove extending slantly from an end of the axial-direction groove.

10. A swing-door gate valve as in claim 8, wherein said gate is attached to the top end of the arm with free movement.

11. A swing-door gate valve as in claim 8, wherein said actuator is a fluid pressure cylinder.

* * * * *